United States Patent
Kapil et al.

(10) Patent No.: US 12,399,804 B2
(45) Date of Patent: Aug. 26, 2025

(54) DETECTING FUNCTIONAL ANOMALIES ASSOCIATED WITH SOFTWARE SERVICES IN A DISTRIBUTED COMPUTING ENVIRONMENT

(71) Applicant: Truist Bank, Charlotte, NC (US)

(72) Inventors: Narayan Kapil, Charlotte, NC (US); Nagaraja Hebbar, Atlanta, GA (US); Sweta Sharan, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 226 days.

(21) Appl. No.: 18/130,679

(22) Filed: Apr. 4, 2023

(65) Prior Publication Data

US 2024/0338299 A1    Oct. 10, 2024

(51) Int. Cl.
  *G06F 9/44* (2018.01)
  *G06F 9/445* (2018.01)
  *G06F 9/455* (2018.01)
  *G06F 11/07* (2006.01)
  *G06F 11/362* (2025.01)

(52) U.S. Cl.
  CPC ........ *G06F 11/366* (2013.01); *G06F 11/0772* (2013.01)

(58) Field of Classification Search
  CPC ............................ G06F 11/366; G06F 11/0772
  See application file for complete search history.

(56) References Cited

U.S. PATENT DOCUMENTS

| | | | | |
|---|---|---|---|---|
| 10,528,454 | B1 * | 1/2020 | Baraty | G06F 11/3684 |
| 11,983,163 | B2 * | 5/2024 | Russell | G06F 11/1451 |
| 12,058,160 | B1 * | 8/2024 | Erlingsson | G06F 16/906 |
| 2019/0319863 | A1 * | 10/2019 | Gupta | H04L 45/22 |
| 2021/0064500 | A1 * | 3/2021 | Przestrzelski | G06F 11/079 |
| 2021/0360083 | A1 * | 11/2021 | Duggal | H04L 67/34 |
| 2022/0124110 | A1 * | 4/2022 | Chhabra | H04L 63/1425 |
| 2023/0034587 | A1 * | 2/2023 | Ranka | G06F 11/0775 |

(Continued)

OTHER PUBLICATIONS

Chenxi Zhang, DeepTraLog: Trace-Log Combined Microservice Anomaly Detection through Graph-based Deep Learning, 2022, pp. 1-12. https://ieeexplore.ieee.org/stamp/stamp.jsp?tp=&arnumber=9793918 (Year: 2022).*

(Continued)

*Primary Examiner* — Mongbao Nguyen
(74) *Attorney, Agent, or Firm* — Kilpatrick Townsend & Stockton LLP; Michael A. Springs, Esq.

(57) ABSTRACT

Some examples can automatically detect functional anomalies associated with software services of a distributed application. For example, a system can receive a configuration file indicating an execution sequence for a set of services of a distributed application. The configuration file can include a mapping of a set of endpoint addresses to the set of services. The system can also receive a mixed set of debugging data associated with the set of services. The system can then parse the mixed set of debugging data into groups corresponding to the set of services based on the mapping in the configuration file. The system can then determine a sequence of debugging events by analyzing the groups, detect a functional anomaly associated with the set of services based on the sequence of debugging events, and generate an alert indicating the functional anomaly to a user.

20 Claims, 7 Drawing Sheets

(56) References Cited

U.S. PATENT DOCUMENTS

| | | | |
|---|---|---|---|
| 2023/0145484 A1* | 5/2023 | Jain ................... | G06F 11/3065 |
| | | | 718/1 |
| 2023/0222028 A1* | 7/2023 | Liao ................... | G06F 11/0784 |
| | | | 714/48 |
| 2023/0333967 A1* | 10/2023 | White .................. | G06F 11/079 |
| 2023/0418729 A1* | 12/2023 | Fitzgerald ............. | G06F 8/33 |
| 2024/0028443 A1* | 1/2024 | Singh .................. | G06F 11/0766 |
| 2024/0126630 A1* | 4/2024 | Nagar .................. | G06F 11/0721 |

OTHER PUBLICATIONS

Jacoposoldani, Anomaly Detection and Failure Root Cause Analysis in (Micro)Service-Based Cloud Applications: A Survey, 2021, pp. 1-36. https://arxiv.org/abs/2105.12378 (Year: 2021).*

* cited by examiner

Mixed Set of Debugging Data 116

1. [Endpoint A] – [IP Address A] – [Pod A] – [Debugging Content]
2. [Endpoint B] – [IP Address A] – [Pod A] – [Debugging Content]
3. [Endpoint A] – [IP Address A] – [Pod A] – [Debugging Content]
4. [Endpoint C] – [IP Address B] – [Pod B] – [Debugging Content]
5. [Endpoint D] – [IP Address D] – [Pod N] – [Debugging Content]
6. [Endpoint A] – [IP Address X] – [Pod A] – [Debugging Content]
7. [Endpoint C] – [IP Address B] – [Pod B] – [Debugging Content]

FIG. 2

Configuration File 120

Service 1
Endpoint: http://www.address.com/endpoint1
Service 2
Endpoint: http://www.address.com/endpoint2
Service 3
Endpoint: http://www.address.com/endpoint3
Service 4
Endpoint: http://www.address.com/endpoint4
Service 5
Endpoint: http://www.address.com/endpoint5

FIG. 4

DETECTING FUNCTIONAL ANOMALIES ASSOCIATED WITH SOFTWARE SERVICES IN A DISTRIBUTED COMPUTING ENVIRONMENT

TECHNICAL FIELD

The present disclosure relates generally to debugging software services executing in a computing environment. More specifically, but not by way of limitation, this disclosure relates to detecting functional anomalies associated with software services in a distributed computing environment.

BACKGROUND

Distributed computing environments have recently grown in popularity given their improved scalability, performance, resilience, and cost effectiveness. Distributed computing environments generally include a group of nodes in communication with each other via one or more networks, such as a local area network. The nodes can be physical machines or virtual machines. Distributed computing environments can be used to execute a wide range of computing jobs, which may involve storing data, retrieving data, or performing computations.

Because distributed computing environments can be complex, it has become increasingly common for administrators to deploy automation software in them to automate various repeatable tasks. One type of automation software is a container orchestration platform. A container orchestration platform can automate the deployment, scaling, and management of containers (e.g., Docker containers) to reduce the workloads of users. Examples of such container orchestration platforms can include Kubernetes®, RedHat OpenShift®, Docker Swarm®, and Amazon ECS®. Containers are relatively isolated virtual environments that can be deployed from image files for running software services in a relatively isolated manner from one another. Containers are normally deployed by leveraging the resource isolation features of the Linux kernel, such as cgroups and namespaces.

Some container orchestration platforms, such as Kubernetes, can deploy containers inside container pods. A container pod ("pod") is a higher-level abstraction of one or more containers that share resources and may be co-located on the same host machine. Pods may be scaled up and down, as needed.

Some container orchestration platforms may also include operators or similar controller software for automating various repeatable tasks, such as deployment and scaling of objects. In the context of Kubernetes, an operator is a software extension that can manage said objects. Once deployed, an operator can manage (e.g., create, configure, and update) instances of its assigned object on behalf of a user in a declarative way. For example, an operator can monitor the state of an assigned object and perform one or more reconciliation operations in response to detecting a state change in the object.

BRIEF DESCRIPTION OF THE DRAWINGS

FIG. 2 shows an example of a mixed set of debugging data according to some aspects of the present disclosure.

FIG. 4 shows an example of a configuration file according to some aspects of the present disclosure.

DETAILED DESCRIPTION

Figure 1:
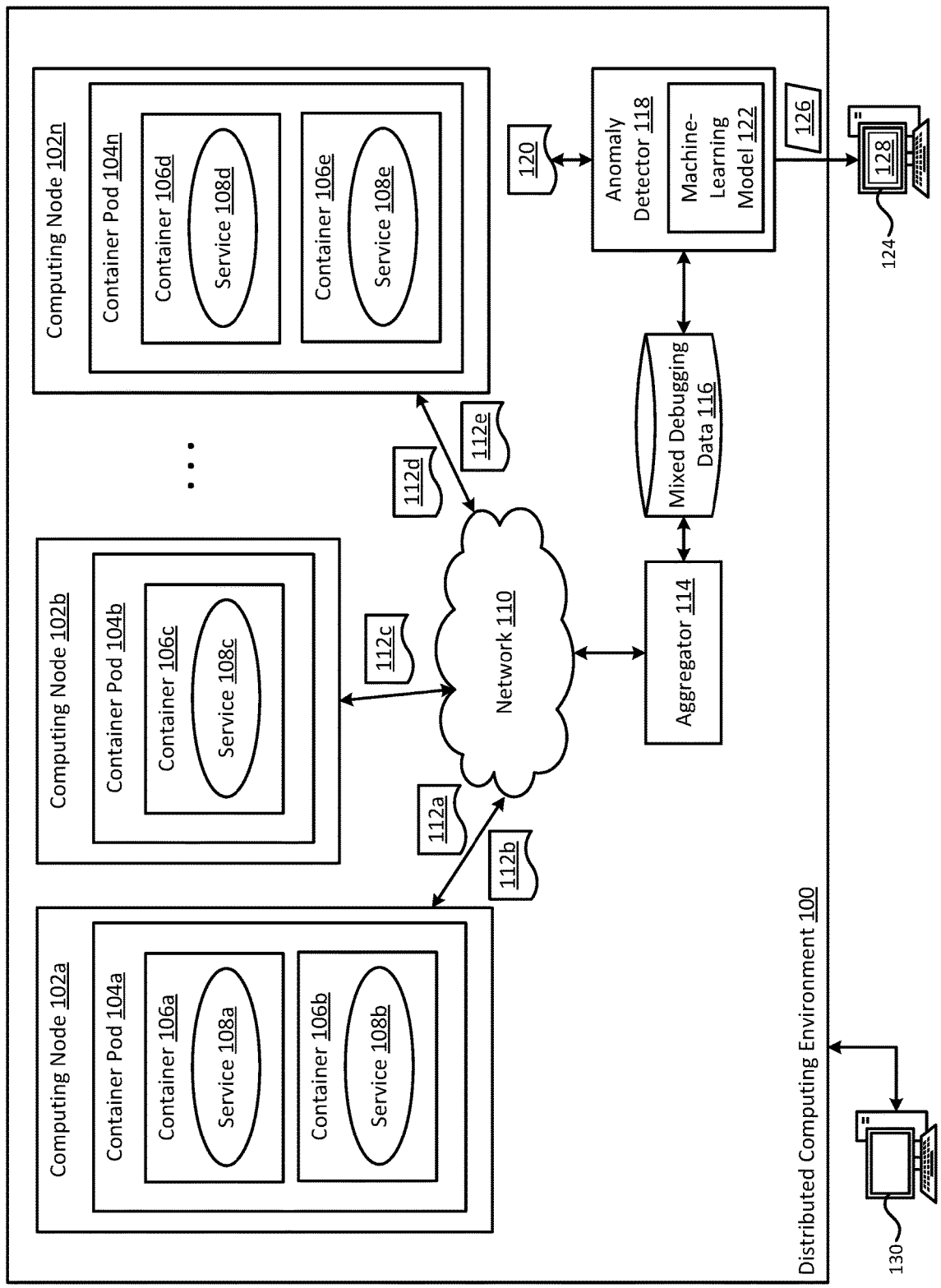
FIG. 1 shows a block diagram of an example of a system for detecting functional anomalies associated with software services in a distributed computing environment according to some aspects of the present disclosure.

Certain aspects and features of the present disclosure relate to an anomaly detector that can automatically detect functional anomalies associated with a set of services (software programs such as microservices or serverless functions) executing in a distributed computing environment. For example, the anomaly detector can receive a configuration file that indicates an execution sequence for the set of services. The set of services may be part of a distributed application deployed in the distributed computing environment. The anomaly detector can also receive a mixed set of debugging data associated with at least one prior execution of the set of services. The mixed set of debugging data can have debugging data associated with each respective microservice dispersed throughout. As a result, the mixed set of debugging data can be organized at least partially out of order from the execution sequence. The anomaly detector can parse the mixed set of debugging data into debugging data groups, where each group corresponds to one of the services. The anomaly detector can then determine a sequence of debugging events by analyzing the plurality of debugging data groups. The anomaly detector can use the sequence of debugging events, and optionally the execution sequence defined in the configuration file, to automatically detect a functional anomaly associated with the set of services. The anomaly detector can then transmit an alert indicating the functional anomaly to a user, such as a system administrator, who can perform one or more operations to mitigate or resolve the problem.

As distributed applications continue to become more complex, it has become increasingly common for a single distributed application to include a large number of distributed services. For example, a distributed application may contain dozens or hundreds of individual microservices running on multiple hardware nodes of a distributed computing environment. And, multiple instances of each individual service may be deployed, depending on the load. For example, the number of instances of each individual service may be dynamically scaled up or down depending on the usage of the distributed application. These services are normally executed in some predefined sequence in response to client requests, to perform some action associated with the distributed application.

As each instance of each individual service executes, debugging data (e.g., log data) may be generated to assist an administrator in resolving any problems. All of this debugging data, for all of the instances of all of the services associated with the distributed application, is often stored in a single log file for review by the administrator. But this can present a variety of problems. Because client requests are received at different times, and because there are often multiple instances of each individual service executing at any given instant in time, the log file may become a jumbled mess of debugging data. For example, if multiple clients request that the distributed application perform the same action at slightly different times, the resulting debugging data for the different services may be dispersed non-sequentially throughout the log file. This remains true even when the services are executed in the same sequential order in response to each client request. This mixed set of debugging data can be challenging for an administrator to digest and analyze, which can make it difficult to detect and debug anomalies (e.g., errors or failures) associated with the services.

Some examples of the present disclosure can overcome one or more of the abovementioned problems by providing an anomaly detector that can automatically parse the mixed set of debugging data into groups corresponding to the services of the distributed application. The anomaly detector can then analyze the grouped debugging data to detect a functional anomaly associated with the services. In some examples, the anomaly detector can perform this analysis by employing one or more machine-learning models, such as neural networks, decision trees, or support vector machines. When performing this analysis, the anomaly detector may also take into account information in a configuration file. For example, the configuration file may specify an execution sequence for the set of services, which can be taken into account to determine whether an anomaly exists. If an anomaly is detected, the anomaly detector can notify one or more relevant parties of the functional anomaly. By notifying the relevant parties of the anomaly, steps can be performed to resolve or mitigate the impact of the anomaly, thereby improving subsequent executions of the distributed application.

In some examples, the mixed set of debugging data can be parsed into the debugging data groups based on endpoint addresses provided in the debugging data. For example, each debugging entry (e.g., line of debugging data) in the mixed set of debugging data may include an endpoint address for the corresponding service that produced the debugging entry, along with the actual debugging content such as a timestamp, an error message, connection acknowledgement, etc. The endpoint address may be a uniform resource locator (URL) address or another type of address for an endpoint of the service. For each debugging entry, the anomaly detector can identify the endpoint address in the debugging entry, correlate that endpoint address to one of the services using a predefined mapping, and then assign the entry to whichever debugging data group corresponds to the service. The predefined mapping of endpoint addresses to services may be provided in the configuration file. Through this process, the anomaly detector can quickly and easily assign the mixed set of debugging data to different debugging data groups, so that some or all of the debugging data corresponding to a particular service is in one group. This can work even if there are multiple instances of the same service running, because all of the instances of the service normally have the same endpoint, so all of the debugging entries associated with all of the instances of that service will be assigned to the same debugging group.

Using the service endpoints as the basis for parsing the mixed set of debugging data can have significant advantages. Because the endpoints normally remain fixed throughout the execution of the distributed application, the endpoints can serve as a consistent identifier of their corresponding services over the lifetime of the distributed application. In contrast, the identifiers of the services themselves (e.g., their process identifiers or network addresses) may dynamically change during the execution of the distributed application, which can make it challenging to use them to uniquely identify the services. For example, as different instances of a given service are scaled up and down, they may be assigned different process names or network addresses (e.g., IP addresses). As a result, if can be challenging to use a process name or IP address to uniquely identify a service. But as noted above, the endpoint of a service normally remains the same during the execution of the distributed application, so the endpoint address may serve as a reliable way to uniquely identify the service. That fact is leveraged by some examples described herein, by using the endpoint address specified in each debugging entry to identify the service to which the debugging entry corresponds. This can allow some or all of the debugging entries related to the same service to be accurately identified and grouped together for subsequent analysis.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system for detecting functional anomalies associated with software services in a distributed computing environment 100 according to some aspects of the present disclosure. Examples of distributed computing environment 100 can include cloud computing systems, data grids, and computing clusters. The distributed computing environment 100 include any number of computing nodes, such as computing nodes 102a-n. The computing nodes can include physical nodes and/or virtual nodes in communication with one another via one or more networks 110. The one or more networks 110 can include a private network such as a local area network, a public network such as the Internet, or both.

A distributed application can be deployed in the distributed computing environment 100. The distributed application can be formed from multiple services, such as services 108a-e. Examples of the services can include microservices and serverless functions. The services can execute on any number and combination of computing nodes. In some examples, the services can be deployed within containers or virtual machines. The containers may, in turn, be deployed within one or more pods. In the example shown in FIG. 1, pod 104a includes two containers 106a-b executing two services 108a-b, respectively. Pod 104b includes one container 106c executing one service 108c. And pod 104n includes two containers 106d-e executing two services 108d-e, respectively. Other arrangements of the services 108a-n, containers 106a-e, and pods 104a-n are also possible.

The distributed application can receive requests from one or more client devices, such as client device 130, which may be external to the distributed computing environment 100 and in communication with the distributed computing environment 100 via one or more networks (e.g., the Internet). Examples of the client devices can include laptop computers, desktop computers, e-readers, tablets, mobile phones, wearable devices, and Internet of Things (IOT) devices. In response to receiving the client requests, the distributed application can perform one or more operations.

To perform a particular operation, some or all of the services 108a-e may be executed in a predefined sequence.

For example, the client device 130 can transmit a request for uploading a file to a repository, which may be part of the functionality of the distributed application. In response to receiving the request, the distributed application may implement an upload operation by executing service 108*a*, then service 108*b*, and then service 108*c*. Specifically, service 108*a* may be used to upload the file to a server, service 108*b* may be used to compress the file, and service 108*c* may be used to store the compressed file in the repository. Other examples may involve a different sequence of the services 108*a-e*.

As each of the services 108*a-e* executes, the service may generate and output debugging data 112*a-e*. For example, service 108*a* may create a first set of debugging data 112*a*, service 108*b* may create a second set of debugging data 112*b*, and service 108*c* may create a third set of debugging data 112*c*, and so on. Each set of debugging data 112*a-e* can include one or more debugging entries. Each debugging entry can include service identification information and the actual debugging content. The service identification information can be any information that is configured to help identify which service created the debugging entry. In some examples, the service identification information can include a process identifier that identifies the computing process associated with the service, an IP address of the service, a pod identifier that identifies the pod executing the service, or any combination of these. But since those identifiers may be transitory and change dynamically during the execution of the distributed application, in some examples the service identification information may additionally or alternatively include an endpoint address associated with the service. Since endpoint addresses may remain fixed while the distributed application is executing, using an endpoint address may serve as a consistent way of identifying the correct service that created a given debugging entry.

An aggregator 114 can receive the sets of debugging data 112*a-e* (e.g., in real time as they are generated) and aggregate them together into a mixed set of debugging data 116. The aggregator 114 may receive the sets of debugging data 112*a-e* from the services 108*a-e* via the network 110. For example, while executing, the service 108*a* can generate a set of debugging data 112*a* and provide the set of debugging data 112*a* to its container pod 104*a*, which in turn can transmit the set of debugging data 112*a* to the aggregator 114 via the network 110. This may avoid having to execute separate logging agents (e.g., a DaemonSet in Kubernetes) on the computing nodes 102*a-n* (e.g., external to the container pods 104*a-n*), which can be beneficial because such loggings agents can consume additional computing resources and may be inflexible.

The aggregator 114 can be software executing on a computing node of the distributed computing environment 100 to generate the mixed set of debugging data 116 and store the mixed set of debugging data 116 in a datastore. The mixed set of debugging data 116 can be stored in a single file or in any other suitable way in the datastore. An administrator may have deployed the aggregator 114 in the distributed computing environment 100 for the purpose of quickly and easily collecting and storing debugging data.

One example of the mixed set of debugging data 116 is shown in FIG. 2. In this example, the mixed set of debugging data 116 includes seven debugging entries (labeled 1-7) associated with different services. The debugging entries are dispersed throughout the mixed set of debugging data 116 and, consequently, the debugging entries may be out of order from the sequence in which the services executed. For example, the sixth entry can correspond to a first service 108*a* and the fourth entry corresponding to a third service 108*c*. Despite the first service 108*a* normally coming earlier in the execution sequence than the third service 108*c*, the sixth entry is later in the mixed set of debugging data 116 than the fourth entry.

In the example shown in FIG. 2, each debugging entry has an endpoint address, an IP address, a Pod identifier, and the actual debugging content. Other examples may have more, less, or different data in each debugging entry. The endpoint address can correspond to the endpoint that was contacted to execute the service. The IP address can correspond to the instance of the service itself that created the debugging entry. The Pod identifier correspond to the pod that contains the instance of the service that created the debugging entry. The debugging content can include timestamps, error codes, connection logs, or other log data.

As shown in FIG. 2, a service 108*a* associated with Endpoint A has a first IP address (IP Address A) in the first debugging entry. The same service 108*a* also has a second IP address (IP address X) in the sixth debugging entry. The service 108*a* may have two different IP addresses associated therewith for any number of reasons, for example because there are multiple instances running of that service 108*a*, or because the IP address of a single instance of that service 108*a* dynamically changed over time due to one or more factors. Other services may also have the same IP address as service 108*a*. For example, service 108*b* can also have the same IP address as the first service 108*a*, as shown in the second debugging entry, because both services 108*a-b* may share a same physical machine. For these reasons, IP addresses may not be a reliable basis on which to consistently determine which debugging entries belong to which services.

A similar problem can arise if pods are used as the basis to determine which debugging entries belong to which services, because a single pod can contain multiple services. For instance, in the example shown in FIG. 2, the services 108*a-b* are both correlated to the same pod (Pod A), because they are both executing within that pod 104*a*, as shown in FIG. 1. This means that pod names may not serve as a reliable basis to uniquely identify the services 108*a-b*.

Unlike the IP addresses and the pod names, the endpoint addresses for each service may remain static throughout the duration of the execution of the distributed application. So, the endpoint addresses may serve as a reliable basis for determining which debugging entries belong to which services. The endpoint addresses can be unique addresses (e.g., URLs) of endpoints through which the services can be accessed. The endpoint addresses are different from the network addresses of the services themselves, and the endpoints are normally different computing nodes than the ones running the services. The endpoints may be configured to provide an application programming interface (API) through which client devices can submit requests to be handled by the corresponding service.

Referring back to FIG. 1, as noted earlier, using the aggregator 114 to collect and combine the sets of debugging data 112*a-e* together into the mixed set of debugging data 116 can have the unwanted side effect of making the resulting debugging log extremely large and challenging to understand. This can limit its usefulness in debugging a problem, should one arise with respect to the distributed application.

To help overcome the abovementioned issues, in some examples the distributed computing environment 100 can include an anomaly detector 118. The anomaly detector 118 can be software executing on a computing node of the distributed computing environment 100. The anomaly detector 118 may be deployed in a sidecar container in the distributed computing environment 100, as an operator (e.g., a Kubernetes operator) in the distributed computing environment, or in any other suitable way. The anomaly detector 118 can automatically parse and analyze the mixed set of debugging data 116 to detect functional anomalies associated with the distributed application.

Figure 3:
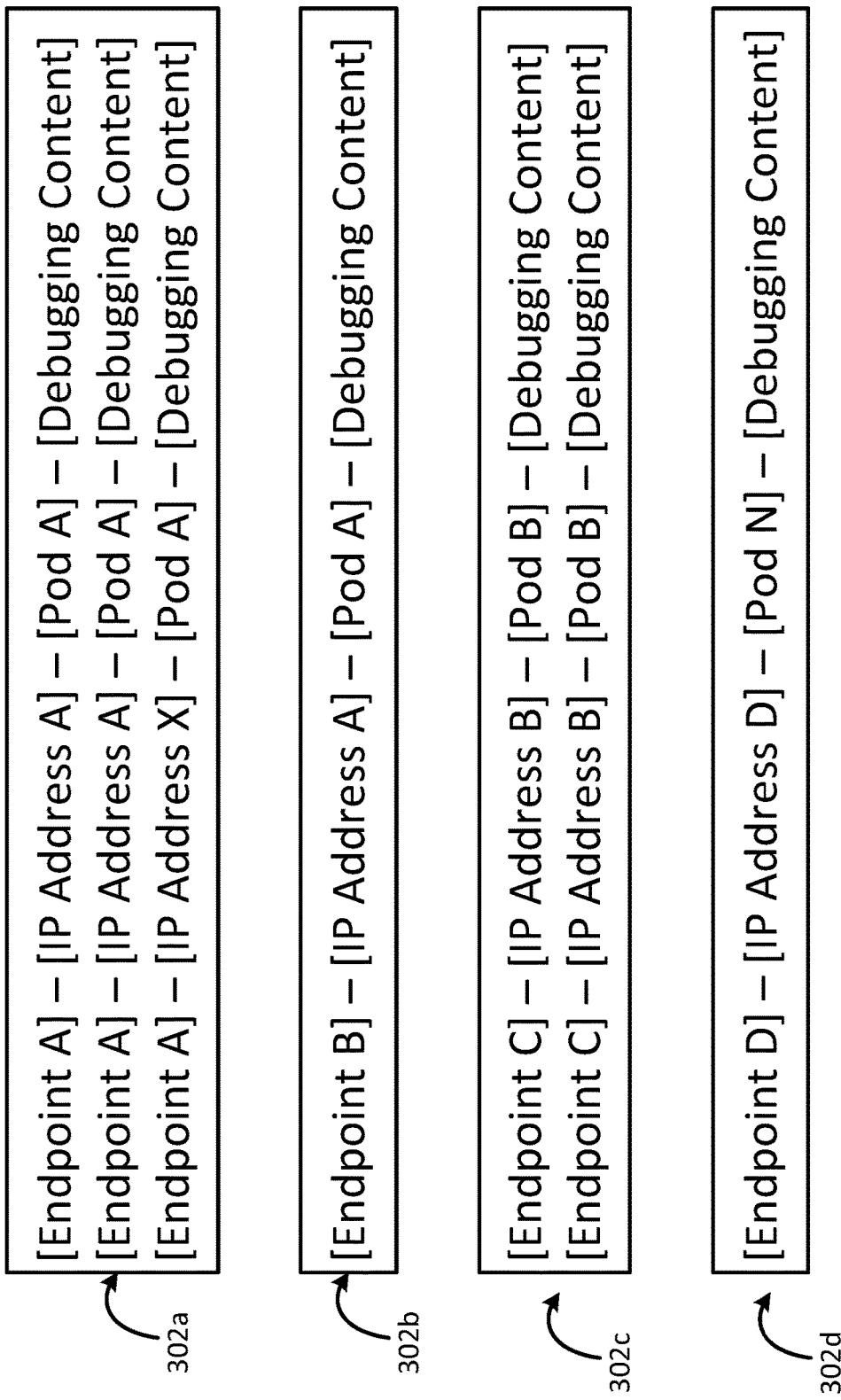
FIG. 3 shows an example of debugging data groups according to some aspects of the present disclosure.

More specifically, the anomaly detector 118 can obtain the mixed set of debugging data 116. This may involve the anomaly detector 118 opening the one or more files containing the mixed set of debugging data 116 on the data store, receiving the mixed set of debugging data 116 from the aggregator 114, etc. The anomaly detector 118 can then parse the mixed set of debugging data 116 into debugging data groups, where each group corresponds to one of the services 108a-e. For example, the mixed set of debugging data 116 shown in FIG. 2 can be parsed into the four groups 302a-n shown in FIG. 3. In that example, the first group 302a can correspond to the first service 108a, the second group 302b can correspond to the second service 108b, the third group 302c can correspond to the third service 108c, and the fourth group 302d can correspond to the fourth service 108d. Each group 302a-d may only contain the debugging entries, from the mixed set of debugging data 116, that correspond to the related service.

To assign the debugging entries to their respective debugging data groups, the anomaly detector 118 can parse the debugging entries based on their endpoint addresses. For example, for each debugging entry in the mixed set of debugging data 116, the anomaly detector 118 can determine the respective endpoint address specified in the entry, determine which service corresponds to the endpoint address using a predefined mapping, and assign the entry to a debugging data group that corresponds to that service. The predefined mapping can correlate endpoint addresses to services.

In some examples, the predefined mapping may be defined in a configuration file 120 that is ingested by the anomaly detector 118. One example of such a configuration file 120 is shown in FIG. 4. As shown, the configuration file 120 can map services to their endpoint address. The configuration file 120 can also indicate the execution sequence for the services 108a-e. For example, the order in which the services 108a-e are listed in the configuration file 120 can be the execution sequence of the services 108a-e. The configuration file 120 can be drafted in a declarative format (e.g., JSON or YAML) or another suitable format by a user. This may allow the user to customize the execution sequence and endpoint mapping as desired. The distributed application may be configured to follow the execution sequence specified in the configuration file 120.

After generating the debugging data groups, the anomaly detector 118 can analyze the debugging entries in each debugging data group to detect a functional anomaly associated with the distributed application. For example, the anomaly detector 118 can analyze the debugging entries in a first debugging data group corresponding to the first service 108a and, based on this analysis, detect an anomaly associated with the first service 108a. In some examples, this analysis may involve analyzing error codes in the debugging entries and/or comparing values in the debugging entries to predefined thresholds. The anomaly detector 118 may perform a similar analysis with respect to some or all of the other debugging data groups to detect one or more anomalies associated with one or more of the other services 108b-e.

In some examples, the anomaly detector 118 can use one or more trained machine-learning models 122, such as a neural network, to detect a functional anomaly associated with a service. For example, the anomaly detector 118 can provide the debugging entries in a debugging data group as input to the trained machine-learning model 122, which can analyze the debugging entries and generate an output indicating whether it has detected an anomaly based on the debugging entries. The trained machine-learning model may analyze each debugging entry individually and/or in combination with other debugging entries to detect anomalies. To do so, the machine-learning model 122 may have previously been trained using training data that, for example, includes known correlations between debugging entries and anomalous conditions. This training data may have been collected over a prior time interval and labeled as needed, for example, to support a supervised training process. Additionally or alternatively to using the trained machine-learning model 112, in some examples the anomaly detector 118 can use other algorithms or predefined rules to detect anomalies associated with a service. For example, the anomaly detector 118 can apply a predefined algorithm or set of rules to the debugging entries in a debugging data group to detect the presence of an anomaly. The predefined rules may, for example, look for certain error codes or variable values that are suggestive of an anomaly.

Figure 5:
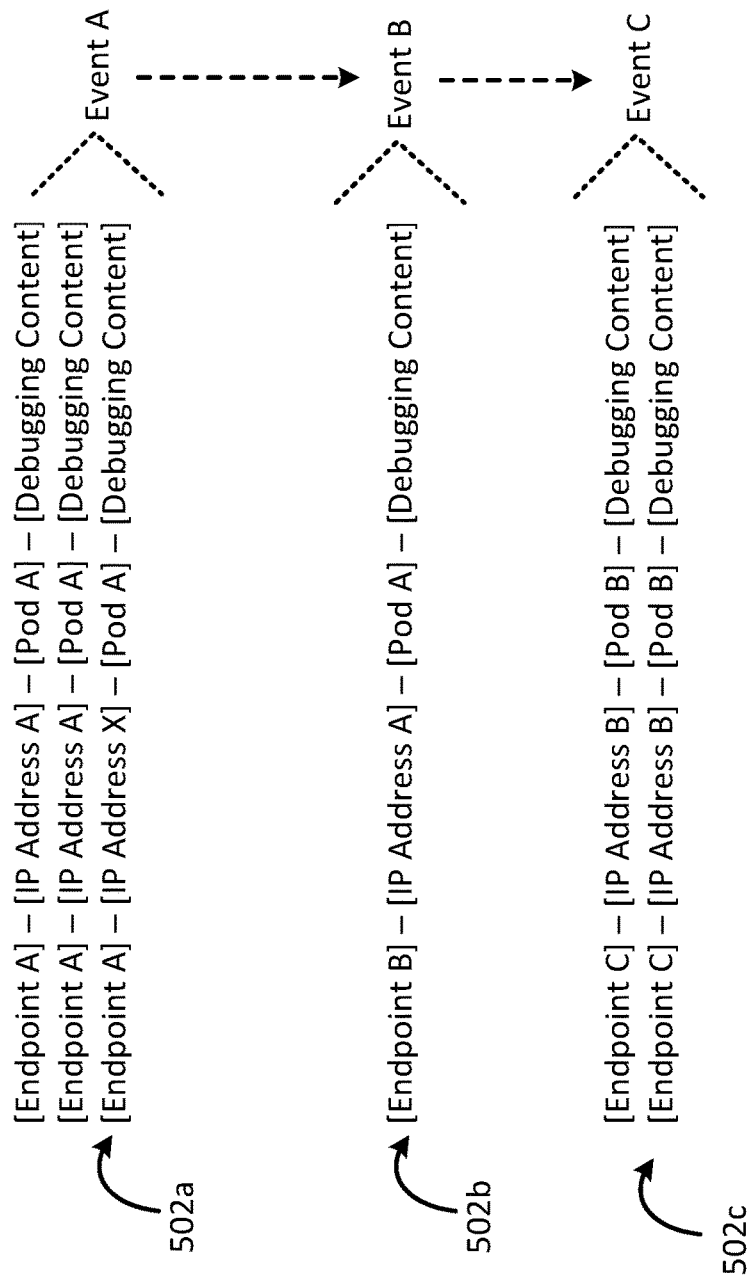
FIG. 5 shows an example of a sequence of debugging events according to some aspects of the present disclosure.

In some examples, the anomaly detector 118 can detect a functional anomaly associated with the distributed application based on a sequence of debugging events reflected in the debugging entries. The sequence of debugging events may have occurred with respect to a single service or may have occurred across multiple services. For example, the anomaly detector 118 can determine that, although the debugging entries in each individual debugging data group may not alone suggest an anomaly, a sequence of debugging events that occurred across multiple services may suggest an anomaly. For instance, a first debugging data group corresponding to a first service 108a can indicate a first debugging event, a second debugging data group corresponding to a second service 108B can indicate a second debugging event, and a third debugging data group corresponding to a third service 108c can indicate a third debugging event. One example of this is shown in FIG. 5, which depicts a sequence of debugging events (Events A, B, and C) derived from the corresponding debugging data groups. None of those three debugging events alone may suggest an anomaly in the functioning of the distributed application. But the combination of all three debugging events, in that particular sequence, may suggest an anomaly.

In some examples, the anomaly detector 118 may detect anomalies based on sequences of debugging events using the one or more trained machine-learning models 122. For example, the anomaly detector 118 can provide each debugging data group as input to the trained machine-learning model 122, which can analyze the debugging data groups and generate an output indicating whether it has detected an anomaly based on a sequence of debugging events on one or more of the groups. To do so, the machine-learning model 122 may have previously been trained using training data that, for example, includes known correlations between certain combinations and/or sequences of debugging events and anomalous conditions.

In some examples, the anomaly detector 118 can take into account the expected execution sequence of the services 106a-n, as defined in the configuration file 120, when determining whether an anomaly exists. For instance, if certain debugging events occur in an unexpected or unusual sequence, based on the execution sequence of the services 106a-n, it may suggest an anomaly. The expected execution sequence of the services 106a-n can be one of the inputs provided to the machine-learning model 122, which can take the expected execution sequence into account when detecting anomalies.

In some examples, the anomaly detector 118 can take into account the expected execution sequence of the services 106a-n, as defined in the configuration file 120, when determining an order in which to organize debugging events. For example, the anomaly detector 118 can analyze multiple debugging data groups to determine a debugging event corresponding to each group. The anomaly detector can then determine, based on the services associated with each group and the expected execution sequence of the services, an order in which to sequence to debugging events. For instance, the anomaly detector 118 can analyze a third debugging data group corresponding to a third service 108c to determine a debugging event, a fifth debugging data group corresponding to a fifth service 108e to determine another debugging event, a second debugging data group corresponding to a second service 108b to determine yet another debugging event, and a first debugging data group corresponding to a first service 108a to determine still another debugging event. But it may be unclear to the anomaly detector 118 how to organize the detected debugging events into a sequential order for further analysis. So, the anomaly detector 118 can use the expected execution sequence defined in the configuration file 120 to organize the debugging events into the right order. For instance, the configuration file may indicate that the execution sequence for the services is first, second, third, fourth, fifth. So, the anomaly detector 118 can organize the detected debugging events into that same sequence, which can then serve as the sequence of debugging events to be subsequently analyzed using any of the techniques described above.

If the anomaly detector 118 detects an anomaly associated with the distributed application (e.g., one or more of the services 108a-e), the anomaly detector 118 can generate a notification 126 such as an alert indicating the functional anomaly. The anomaly detector 118 can then transmit the notification 126 to a client device 124 of a user, such as an administrator. This may allow the user to take any necessary corrective action to mitigate the problem. Additionally or alternatively, the anomaly detector 118 may automatically execute one or more mitigation operations configured to mitigate the problem. For example, the anomaly detector 118 may shutdown, stop, or restart one or more services, containers, or container pods associated with a detected anomaly in an effort to resolve the anomaly. In some examples, the anomaly detector 118 may consult a predefined mapping to determine how to address a particular anomaly. The predefined mapping may correlate certain types of anomalies to corresponding mitigation operations. Based on the predefined mapping, the anomaly detector 118 can select one or more mitigation operations to execute to help resolve a detected anomaly.

In some examples, the anomaly detector 118 can provide a graphical user interface 128 through which a user can review and analyze debugging data for a selected service. For example, the graphical user interface 128 can include a list of services 108a-e associated with the distributed application. A user can select, using the client device 124, a target service 108a from the list for which to view corresponding debugging data. In response to receiving the user selection, the client device 124 can transmit a request indicating the user selection to the anomaly detector 118. The anomaly detector 118 can, based on the user selection, retrieve the debugging entries from the debugging data group corresponding to the selected service 108a. The anomaly detector 118 can then transmit the debugging entries back to the client device 124 for display in the graphical user interface 128. This may allow the user to limit the amount of debugging data that they view, for example to only the debugging data of interest for a target service 108a. This can make it easier to detect anomalies and debug problems than viewing the entire mixed set of debugging data 116.

Although FIG. 1 shows a certain number and arrangement of components, this is intended to be illustrative and non-limiting. Other examples may include more components, fewer components, different components, or a different arrangement of components than is shown in FIG. 1. For instance, in other examples, the aggregator 114 and/or the anomaly detector 118 may be located outside the distributed computing environment 100.

Figure 6:
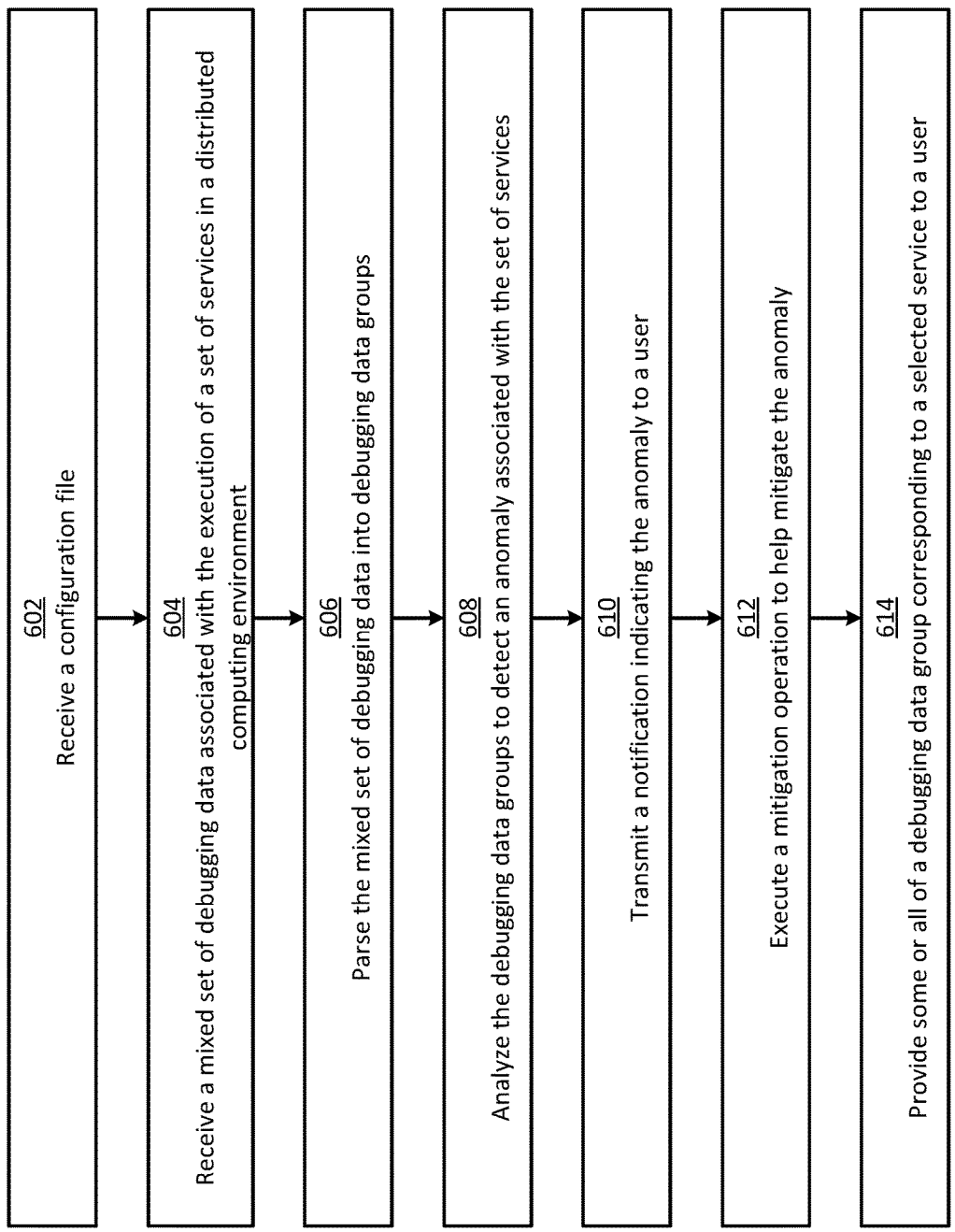
FIG. 6 shows a flowchart of an example of a process for detecting functional anomalies associated with software services in a distributed computing environment according to some aspects of the present disclosure.

FIG. 6 shows a flowchart of an example of a process for detecting functional anomalies associated with software services in a distributed computing environment according to some aspects of the present disclosure. Other examples may involve more operations, fewer operations, different operations, or a different sequence of operations than is shown in FIG. 6. The operations of FIG. 6 are described below with reference to the components of FIG. 1.

In block 602, an anomaly detector 118 receives a configuration file 120. The configuration file 120 can indicate an execution sequence for a set of services (e.g., services 104a-e) of a distributed application. The configuration file 120 may additionally or alternatively include a mapping of a set of endpoint addresses to the set of services. The set of endpoint addresses correspond to endpoints for accessing the set of services.

In block 604, the anomaly detector 118 receives a mixed set of debugging data 116 associated with at least one prior execution of the set of services in a distributed computing environment 100. The mixed set of debugging data 116 includes respective debugging data associated with one or more instances of each service in the set of services. The respective debugging data associated with the one or more instances of each service is dispersed through the mixed set of debugging data 116, such that the mixed set of debugging data 116 is organized at least partially out of order from the execution sequence defined in the configuration file 120.

In block 606, the anomaly detector 118 parses the mixed set of debugging data 116 into debugging data groups corresponding to the set of services. The anomaly detector 118 may parse the mixed set of debugging data 116 based on the mapping in the configuration file 120. Each debugging data group can be associated with a corresponding service in the set of services.

In block 608, the anomaly detector 118 analyzes the debugging data groups to detect an anomaly (e.g., functional anomaly) associated with the set of services. For example, the anomaly detector 118 can determine a sequence of debugging events associated with the at least one prior execution of the set of services by analyzing the debugging data groups. To determine the sequence of debugging events, in some examples the anomaly detector 118 may use the execution sequence for the set of services defined in the configuration file 120.

In block 610, the anomaly detector 118 optionally transmits a notification 126 indicating the anomaly to a user. For example, the anomaly detector 118 can transmit the notification 126 to a client device 124 of the user via one or more networks, such as the Internet.

In block 612, the anomaly detector 118 optionally executes a mitigation operation to help mitigate the anomaly. For example, the anomaly detector 118 can determine the mitigation operation using a predefined set of rules or a predefined mapping. The predefined mapping can correlate different anomalies to mitigation operations. After determining the mitigation operation, the anomaly detector 118 can execute the mitigation operation. In this way, the anomaly detector 118 may be able to automatically detect and resolve anomalies, which can improve the execution of the set of services.

In block 614, the anomaly detector 118 optionally provides some or all of the debugging entries in a debugging data group, which corresponds to a selected service, to a user. For example, the anomaly detector 118 can generate a graphical user interface 128 that includes a list of the set of services. The user can then select a target service from among the list. The anomaly detector 118 can detect the selection and, in response, determine which debugging entries correspond to the selected service. This may involve determining which debugging data group corresponds to the selected service and extracting the relevant debugging entries from that debugging data group. The anomaly detector 118 can then output the debugging entries in the graphical user interface 128 for viewing by the user.

Figure 7:
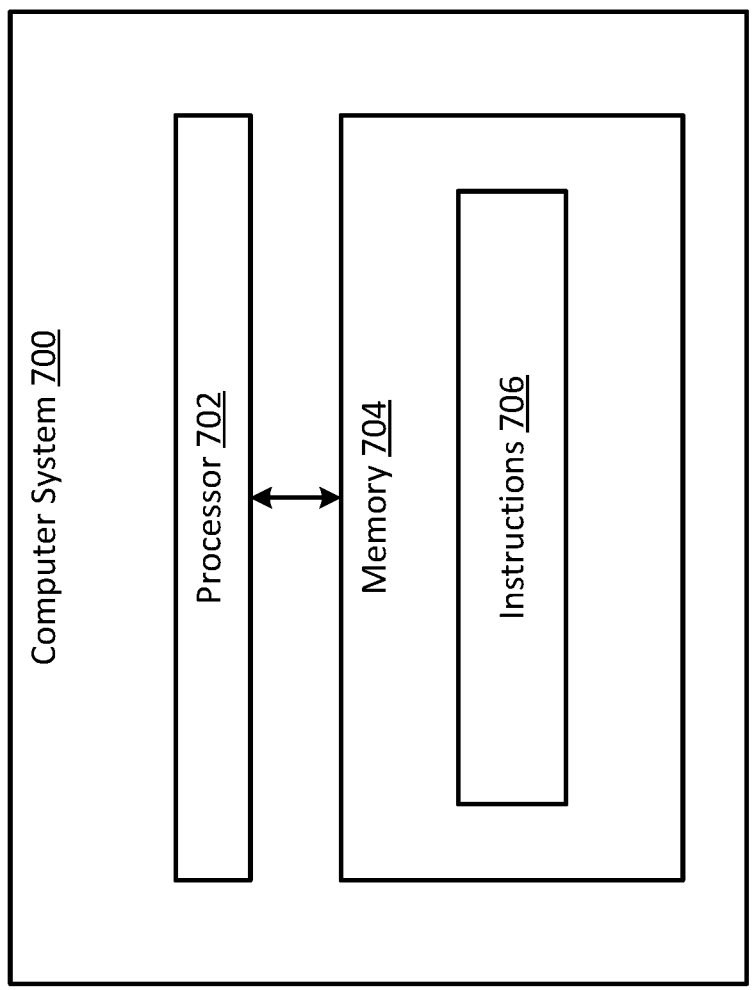
FIG. 7 shows a block diagram of an example of a computer system usable to implement some aspects of the present disclosure.

FIG. 7 shows a block diagram of an example of a computer system 700 usable to implement some aspects of the present disclosure. In some examples, the computer system 700 may correspond to the client device 130, the client device 124, one or more of the computing nodes 102a-n, a computing node running the aggregator 114, a computing node running the anomaly detector 118, etc.

The computer system 700 includes a processor 702 coupled to a memory 704 via a bus. The processor 702 can include one processing device or multiple processing devices. Examples of the processor 502 include a Field-Programmable Gate Array (FPGA), an application-specific integrated circuit (ASIC), and a microprocessor. The processor 702 can execute instructions 706 stored in the memory 704 to perform operations. Examples of such operations can include any of the operations described above with respect to the anomaly detector 118. In some examples, the instructions 706 can include processor-specific instructions generated by a compiler or an interpreter from code written in any suitable computer-programming language, such as C, C++, C #, etc.

The memory 704 can include one memory device or multiple memory devices. The memory 704 can be volatile or non-volatile (e.g., it retains stored information when powered off). Examples of the memory 704 include electrically erasable and programmable read-only memory (EEPROM), flash memory, or any other type of non-volatile memory. At least some of the memory 704 includes a non-transitory computer-readable medium from which the processor 702 can read instructions 706. A computer-readable medium can include electronic, optical, magnetic, or other storage devices capable of providing the processor 702 with computer-readable instructions or other program code. Examples of a computer-readable medium include magnetic disks, memory chips, ROM, random-access memory (RAM), an ASIC, a configured processor, and optical storage.

The computer system 700 may also include other input and output (I/O) components, which are not shown here for simplicity. Examples of such input components can include a mouse, a keyboard, a trackball, a touch pad, and a touch-screen display. Examples of such output components can include a visual display, an audio display, and a haptic display. Examples of a visual display can include a liquid crystal display (LCD), a light-emitting diode (LED) display, and a touch-screen display. An example of an audio display can include speakers. An example of a haptic display may include a piezoelectric vibration device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A computer-implemented method comprising:
   executing, by one or more processors, a set of services of a distributed application in response to a client request, the set of services being executed in a particular execution sequence in response to the client request, wherein a mixed set of debugging data is generated as a result of executing the set of services;
   receiving, by an anomaly detector executing on the one or more processors, a configuration file indicating the particular execution sequence for the set of services of the distributed application, wherein the configuration file also includes a mapping of a set of endpoint addresses to the set of services, the set of endpoint addresses corresponding to endpoints that are distinct locations from the set of services and usable for accessing the set of services, wherein the configuration file is separate from the mixed set of debugging data; and
   subsequent to executing the set of services:
      receiving, by the anomaly detector, the mixed set of debugging data associated with the execution of the set of services, wherein the mixed set of debugging data includes respective debugging data associated with one or more instances of each service in the set of services, wherein the respective debugging data associated with the one or more instances of each service is dispersed through the mixed set of debugging data such that the mixed set of debugging data is organized at least partially out of order from the particular execution sequence;
      parsing, by the anomaly detector, the mixed set of debugging data into a plurality of debugging data groups corresponding to the set of services based on the mapping in the configuration file, each debugging data group being associated with a corresponding service in the set of services;
      determining, by the anomaly detector, a sequence of debugging events associated with the execution of the set of services by performing an analysis of the plurality of debugging data groups;
      detecting, by the anomaly detector, a functional anomaly associated with the execution of the set of services based on the sequence of debugging events;
      generating, by the anomaly detector, an alert indicating the functional anomaly to a user.

2. The computer-implemented method of claim 1, wherein parsing the mixed set of debugging data into the plurality of debugging data groups involves:
   for each entry of debugging data in the mixed set of debugging data:
      determining a respective endpoint address specified in the entry;

determining a respective service, among the set of services, that corresponds to the respective endpoint address using the mapping in the configuration file, wherein the respective endpoint address is different from an address of the respective service; and assigning the entry to a respective debugging data group, among the plurality of debugging data groups, that corresponds to the respective service.

3. The computer-implemented method of claim 1, wherein the mixed set of debugging data includes first debugging data associated with a first service, and wherein the mixed set of debugging data includes second debugging data associated with a second service that is later in the particular execution sequence than the first service, the second debugging data being positioned in the mixed set of debugging data prior to the first debugging data.

4. The computer-implemented method of claim 1, wherein determining the sequence of debugging events involves:

analyzing each respective debugging data group among the plurality of debugging data groups to determine a respective debugging event associated with the corresponding service; and organizing the respective debugging event associated with each corresponding service into a sequential order based on the particular execution sequence defined in the configuration file, to thereby determine the sequence of debugging events.

5. The computer-implemented method of claim 1, wherein detecting the functional anomaly associated with the set of services based on the sequence of debugging events involves:

providing the plurality of debugging data groups as input to a trained machine-learning model, the trained machine-learning model being configured to automatically analyze the plurality of debugging data groups and generate an output indicating the functional anomaly.

6. The computer-implemented method of claim 1, wherein the set of endpoint addresses are uniform resource locator (URL) addresses of the endpoints.

7. The computer-implemented method of claim 1, wherein the configuration file is user defined in a declarative format.

8. The computer-implemented method of claim 1, further comprising:

receiving respective sets of debugging data from one or more container pods executing the set of services, wherein each respective set of debugging data is specific to an associated service among the set of services, and wherein the one or more container pods are deployed on one or more hardware nodes of a distributed computing environment; and generating the mixed set of debugging data by aggregating the respective sets of debugging data together into a single log.

9. The computer-implemented method of claim 8, wherein the anomaly detector is deployed in a sidecar container of the distributed computing environment.

10. The computer-implemented method of claim 8, wherein the distributed computing environment is a Kubernetes environment, and wherein the anomaly detector is deployed as an operator in the Kubernetes environment.

11. The computer-implemented method of claim 1, further comprising:

receiving a user selection of a target service in the set of services for which to display corresponding debugging data; and in response to receiving the user selection, generating a graphical user interface that includes the respective debugging data corresponding to the target service and excludes a remainder of the mixed set of debugging data corresponding to a remainder of the set of services.

12. The computer-implemented method of claim 1, wherein each debugging data group consists of the respective debugging data for only a single corresponding service of the set of services.

13. The computer-implemented method of claim 1, wherein the configuration file is received by the anomaly detector prior to the set of services being executed.

14. A system comprising:

one or more processors; and one or more memories including instructions that are executable by the one or more processors for causing the one or more processors to:

execute a set of services of a distributed application in response to a client request, the set of services being executed in a particular execution sequence in response to the client request, wherein a mixed set of debugging data is generated as a result of executing the set of services;

receive a configuration file indicating the particular execution sequence for the set of services of the distributed application, wherein the configuration file also includes a mapping of a set of endpoint addresses to the set of services, the set of endpoint addresses corresponding to endpoints that are distinct locations from the set of services and usable for accessing the set of services, wherein the configuration file is separate from the mixed set of debugging data; and subsequent to executing the set of services:

receive the mixed set of debugging data associated with the execution of the set of services, wherein the mixed set of debugging data includes respective debugging data associated with one or more instances of each service in the set of services, wherein the respective debugging data associated with the one or more instances of each service is dispersed through the mixed set of debugging data such that the mixed set of debugging data is organized at least partially out of order from the particular execution sequence;

parse the mixed set of debugging data into a plurality of debugging data groups corresponding to the set of services based on the mapping in the configuration file, each debugging data group being associated with a corresponding service in the set of services;

determine a sequence of debugging events associated with the execution of the set of services by performing an analysis of the plurality of debugging data groups;

detect a functional anomaly associated with the execution of the set of services based on the sequence of debugging events; and generate an alert indicating the functional anomaly to a user.

15. The system of claim 14, wherein the one or more memories further include instructions that are executable by the one or more processors for causing the one or more processors to parse the mixed set of debugging data into the plurality of debugging data groups by:
  for each entry of debugging data in the mixed set of debugging data:
    determining a respective endpoint address specified in the entry;
    determining a respective service, among the set of services, that corresponds to the respective endpoint address using the mapping in the configuration file; and
    assigning the entry to a respective debugging data group, among the plurality of debugging data groups, that corresponds to the respective service.

16. The system of claim 14, wherein the one or more memories further include instructions that are executable by the one or more processors for causing the one or more processors to determine the sequence of debugging events by:
  analyzing each respective debugging data group among the plurality of debugging data groups to determine a respective debugging event associated with the corresponding service; and
  organizing the respective debugging event associated with each corresponding service into a sequential order based on the particular execution sequence defined in the configuration file, to thereby determine the sequence of debugging events.

17. The system of claim 14, wherein the one or more memories further include instructions that are executable by the one or more processors for causing the one or more processors to detect the functional anomaly associated with the set of services based on the sequence of debugging events by:
  providing the plurality of debugging data groups as input to a trained machine-learning model, the trained machine-learning model being configured to automatically analyze the plurality of debugging data groups and generate an output indicating the functional anomaly.

18. The system of claim 14, wherein the one or more memories further include instructions that are executable by the one or more processors for causing the one or more processors to:
  receive respective sets of debugging data from one or more container pods executing the set of services, wherein each respective set of debugging data is specific to an associated service among the set of services, and wherein the one or more container pods are deployed on one or more hardware nodes of a distributed computing environment; and
  generate the mixed set of debugging data by aggregating the respective sets of debugging data together into a single log.

19. A non-transitory computer-readable medium comprising program code that is executable by one or more processors for causing the one or more processors to:
  execute a set of services of a distributed application in response to a client request, the set of services being executed in a particular execution sequence in response to the client request, wherein a mixed set of debugging data is generated as a result of executing the set of services;
  receive a configuration file indicating the particular execution sequence for the set of services of the distributed application, wherein the configuration file also includes a mapping of a set of endpoint addresses to the set of services, the set of endpoint addresses corresponding to endpoints that are distinct locations from the set of services and usable for accessing the set of services, wherein the configuration file is separate from the mixed set of debugging data; and
  subsequent to executing the set of services:
    receive the mixed set of debugging data associated with the execution of the set of services, wherein the mixed set of debugging data includes respective debugging data associated with one or more instances of each service in the set of services, wherein the respective debugging data associated with the one or more instances of each service is dispersed through the mixed set of debugging data such that the mixed set of debugging data is organized at least partially out of order from the particular execution sequence;
    parse the mixed set of debugging data into a plurality of debugging data groups corresponding to the set of services based on the mapping in the configuration file, each debugging data group being associated with a corresponding service in the set of services;
    determine a sequence of debugging events associated with the execution of the set of services by performing an analysis of the plurality of debugging data groups;
    detect a functional anomaly associated with the set of services based on the execution of the sequence of debugging events; and
    generate an alert indicating the functional anomaly to a user.

20. The non-transitory computer-readable medium of claim 19, further comprising program code that is executable by the one or more processors for causing the one or more processors to parse the mixed set of debugging data into the plurality of debugging data groups by:
  for each entry of debugging data in the mixed set of debugging data:
    determining a respective endpoint address specified in the entry;
    determining a respective service, among the set of services, that corresponds to the respective endpoint address using the mapping in the configuration file; and
    assigning the entry to a respective debugging data group, among the plurality of debugging data groups, that corresponds to the respective service.

* * * * *